United States Patent
Li et al.

(10) Patent No.: US 7,123,892 B2
(45) Date of Patent: Oct. 17, 2006

(54) ARCHITECTURE FOR AN AM/FM DIGITAL INTERMEDIATE FREQUENCY RADIO

(75) Inventors: Junsong Li, Austin, TX (US); Bradley A. Banks, Austin, TX (US); Yui-Luen J. Ho, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 553 days.

(21) Appl. No.: 10/683,493

(22) Filed: Oct. 10, 2003

(65) Prior Publication Data

US 2005/0079838 A1  Apr. 14, 2005

(51) Int. Cl.
*H04B 1/26* (2006.01)

(52) U.S. Cl. ............... 455/142; 455/196.1; 455/205; 455/323; 375/324

(58) Field of Classification Search ............ 455/142, 455/313, 323, 90.1, 143, 144, 196.1, 205; 375/324, 320, 346
See application file for complete search history.

(56) References Cited

U.S. PATENT DOCUMENTS

| | | | | |
|---|---|---|---|---|
| 4,470,147 A | * | 9/1984 | Goatcher | 375/321 |
| 4,688,264 A | * | 8/1987 | Miura | 455/168.1 |
| 5,387,913 A | * | 2/1995 | Park et al. | 341/155 |
| 5,732,337 A | * | 3/1998 | Wargnier et al. | 455/144 |
| 6,002,924 A | * | 12/1999 | Takano | 455/161.1 |
| 2001/0044285 A1 | * | 11/2001 | Hirayasu | 455/226.1 |

* cited by examiner

*Primary Examiner*—Edward F. Urban
*Assistant Examiner*—Blane J. Jackson
(74) *Attorney, Agent, or Firm*—James L. Clingan, Jr.

(57) ABSTRACT

An AM/FM DIF radio has an IF to audio converter that provides an audio signal from an IF signal responsive to a clock signal. During the processing of the IF signal, a spurious signal is intentionally generated. The spurious signal is based on the predetermined offset which is included in the IF signal applied to an A/D converter. The predetermined offset is greater than or equal to half of the AM bandwidth and less than or equal to the system bandwidth. The spurious signal is generated at a frequency proportional to the sum of an imprecision offset and the predetermined offset. A low pass filter removes the spurious signal while preserving the desired portion of the audio signal.

20 Claims, 1 Drawing Sheet

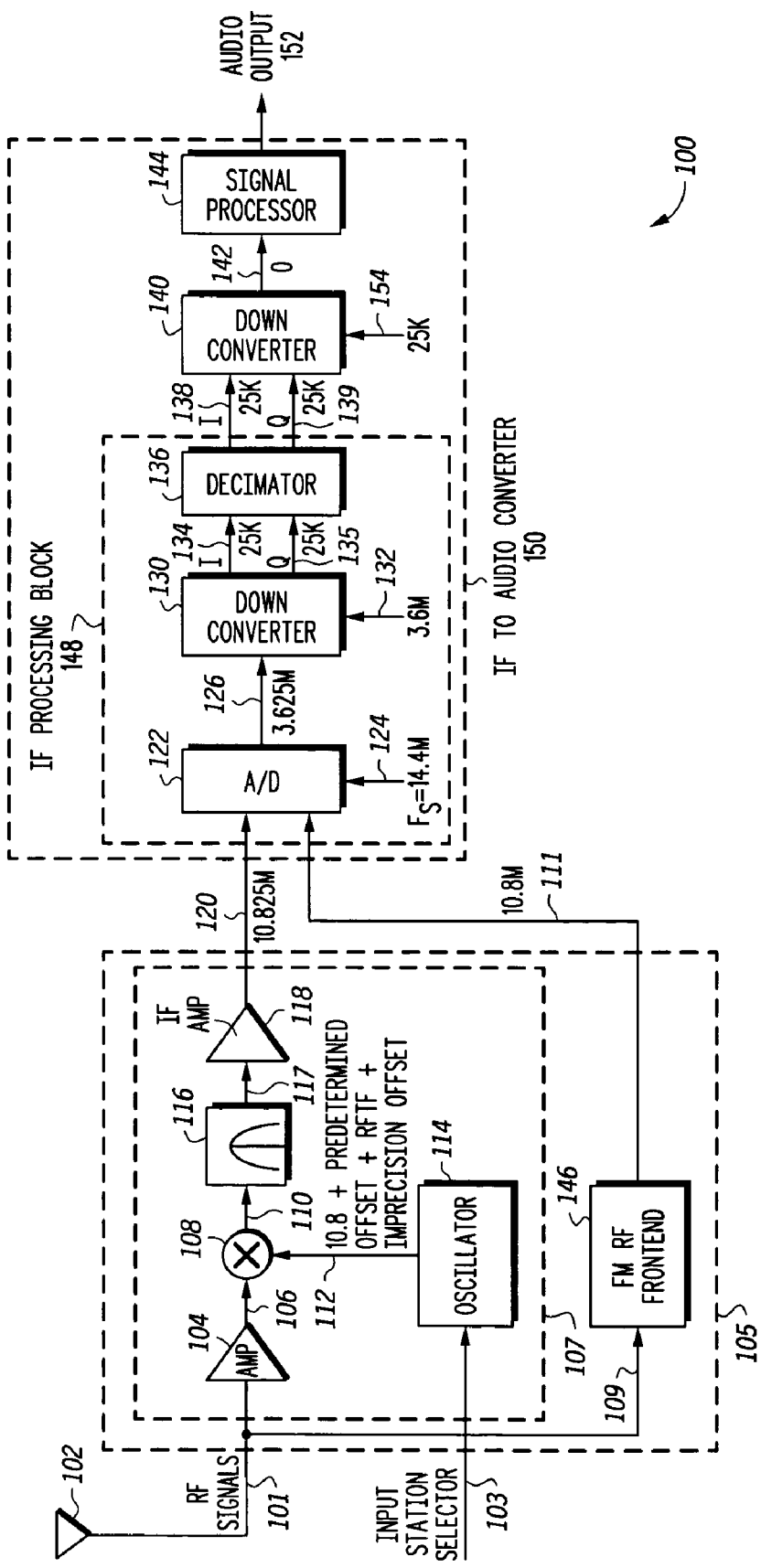
FIGURE

ARCHITECTURE FOR AN AM/FM DIGITAL INTERMEDIATE FREQUENCY RADIO

FIELD OF THE INVENTION

The present invention relates to a radio receiver, and more particularly, to an AM/FM digital intermediate frequency radio receiver.

RELATED ART

Radio receivers are known in the art of communications. One type of radio receiver currently known in the art is the AM/FM digital intermediate frequency (DIF) radio receiver. When attempting to use an AM/FM DIF radio receiver for AM reception, several issues arise relative to the AM/FM DIF receiver being designed primarily to take advantage of its use as an FM receiver.

For example, a fundamental difficulty in AM/FM DIF radio receivers relates to the difference between the resolution requirements of an A/D converter used for AM reception and an A/D converter used for FM reception. The analog-to-digital converters in typical AM/FM DIF radio receivers are designed primarily for FM reception and as such, the sample resolution provided in A/D converters is not wide enough to accommodate for the resolution necessary for AM signals. Since more bits are required per sample for AM signals then for FM signals, insufficient sampling resolution for AM reception causes unwanted spurious tones to appear in the desired AM bandwidth. The addition of spurious tones to the AM bandwidth is undesirable since it leads to distortion in the audio signal provided to the end user.

One solution known in the art to resolve the resolution deficiency in the AM/FM DIF radio A/D converter is to increase the bit width of the A/D converter. The increased bit width, however, requires increased real estate, i.e., a substantial increase in die size in order to achieve the higher bit width, which results in increased cost of the A/D converter and the AM/FM DIF radio receiver.

An additional difficulty in AM/FM DIF systems occurs when the local oscillator is not locked to the incoming carrier frequency. As a result, an oscillator-to-carrier offset exists and the local oscillator lacks a high-degree of precision resulting in receiver instability. A solution known in the art today is to lock the local oscillator to the incoming carrier signal frequency, thereby removing the offset between the incoming carrier and the local oscillator. A significant drawback in this solution is, however, that it necessitates the use of an additional PLL to track the incoming AM carrier signal, which results in increased cost of the AM/FM DIF radio receiver and also limits the reuse of the existing FM architecture.

These two difficulties, the bit resolution deficiency and unlocked oscillator conspire together to reduce the performance of the AM portion of the AM/FM DIF radio. Therefore, a need exists to optimize AM performance without digressing from the existing FM architecture, while still maintaining cost efficiency and improved audio performance.

BRIEF DESCRIPTION OF THE DRAWINGS

The present invention is illustrated by way of example and not limited by the accompanying FIGURE, in which like references indicate similar elements, and in which:

The sole FIGURE illustrates, in block diagram form, a radio receiver system in accordance with one embodiment of the present invention.

Skilled artisans appreciate that elements in the FIGURE are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

One embodiment of the present invention relates to a circuit having a system bandwidth. An IF signal having a first frequency and a predetermined offset is generated by a front end. An IF to audio converter, which may also be called a backend, is coupled to the front end and is characterized by being responsive to a clock signal having a second frequency and receiving the IF signal and converting it to an audio signal. A spurious signal is generated by the IF to audio converter outside the desired bandwidth at a frequency proportional to the sum of an imprecision offset and the predetermined offset.

Another embodiment of the present invention relates to a circuit having a system bandwidth and an AM bandwidth. The circuit includes an FM front end that generates a first IF signal having a first frequency, an AM front end that generates a second IF signal having a second frequency and a predetermined offset, and an IF processor that receives a selected one of the first IF signal and the second IF signal. The first IF signal is converted by the IF processor to a first baseband signal when the first IF signal is received. The second IF signal is converted by the IF processor to a third signal having a center frequency at the predetermined offset when the second IF signal is received. The third signal is converted by the IF processor to a second baseband signal where a spurious tone is then filtered out.

One embodiment of the present invention relates to a circuit having a system bandwidth. The circuit includes an AM front end that generates an IF signal having a first frequency and a predetermined offset, and an IF to audio converter coupled to the AM front end. The IF to audio converter is characterized by being responsive to a clock signal that has a second frequency, receiving the IF signal and converting the IF signal to an audio signal. A spurious signal is generated by the IF to audio converter outside the AM bandwidth at a frequency proportional to the sum of an imprecision offset and the predetermined offset. The predetermined offset is greater than or equal to half of the AM bandwidth and less than or equal to the system bandwidth.

Yet another embodiment of the present invention relates a method of processing an AM signal in a circuit having a system bandwidth. A first IF signal is derived having a predetermined offset and a first frequency from the AM signal. The first IF signal is converted to an audio signal in response to a clock signal that has a second frequency. A spurious signal is generated outside an AM bandwidth at a frequency proportional to the sum of an imprecision offset and the predetermined offset. These embodiments are better understood with reference to the drawing and the following description.

Shown in the FIGURE is a system diagram illustrating one embodiment of an AM/FM digital intermediate frequency (DIF) radio receiver 100 built in accordance with the principles of the present invention. DIF radio 100 includes antenna 102, amplifier 104, mixer 108, bandpass filter 116, intermediate frequency amplifier 118, oscillator 114, FM RF frontend 146, AM-RF frontend 107 analog-to-digital converter 122, down converter 130, decimator 136, down converter 140, and signal processor 144. Of course, numerous modifications are possible for radio receiver 100 and this is only an exemplary embodiment for purposes of describing the present invention.

In operation, antenna 102 captures radio frequency (RF) signals broadcasted from a AM/FM transmitter and provides the RF signals 101 to RF frontend 105. RF frontend 105 includes FM-RF frontend 146 and AM-RF frontend 107. Depending on whether AM/FM DIF radio receiver 100 is FM mode or AM mode, RF signals 101 are provided to AM-RF frontend 107 or FM-RF frontend 146. For this embodiment, assume the AM/FM DIF radio receiver 100 is in AM mode and the RF signals 101 are input into amplifier 104 for low noise signal amplification. The amplified RF signals 106 are fed to mixer 108 and mixed with the output of oscillator 114 (local oscillator frequency 112). Local oscillator frequency 112 includes a predetermined offset (which is predicated by the need to remove spurious tones caused by A/D 122), an intermediate frequency, an imprecision offset, and a radio frequency tuning frequency (RFTF). The RFTF is tuned to a radio frequency using input station selector 103. The output 110 of mixer 108 is fed into bandpass filter 116 to allow the desired frequency band to pass through the remaining portion of receiver 100. The output of bandpass filter 116 is then amplified by IF amplifier 118, whose output 120 is fed into IF-to-Audio converter 150.

IF-to-Audio converter 150 includes IF processing block 148 and a digital signal processing portion including downconverter 140 and signal processor 144. The analog-to-digital (A/D) converter 122 of IF processing block 148 receives the output of RF frontend 105 and uses the sampling frequency 124 to generate a digitized version of output signal 120. Sampling techniques used by A/D converters are known in the art and are not presented here in detail.

Downconverter 130 receives the digitized output of A/D 126 and uses mixing frequency signal 132 to generate an in-phase digital signal 134 and quadrature-phase digital signal 135 centered at the predetermined offset frequency. Decimator 136 receives the in-phase digital signal 134 and quadrature-phase digital signal 135 and reduces the sampling rate to a minimal sampling rate in order to conserve processing cycles in signal processor 144. The output of decimator 136, still being centered at the predetermined offset frequency, is then down converted by down converter 140 before being input into signal processor 144 to generate the desired audio output 152.

In the embodiment shown in the FIGURE, AM/FM RF signals are received by antenna 102. The AM/FM DIF radio receiver 100 is in AM mode and thus FM RF frontend 146 is held in abeyance. Input station selector 103 is tuned to a radio station within the AM band by adjusting the RFTF of oscillator 114. Oscillator 114 is regulated to the IF frequency used in the FM system (in this case 10.8 MHz) and adjusted by at least the minimum predetermined offset and at most the maximum predetermined offset discussed below.

The predetermined offset of AM-RF frontend 107 is based on the AM bandwidth and selected such that the predetermined offset is greater than or equal to half of the AM bandwidth and less than or equal to the system bandwidth. The selected predetermined offset is added to the intermediate frequency component and RFTF frequency component to form the local oscillator frequency 112. Adding the predetermined offset to the RFTF frequency and IF frequency components allows the spurious tones created by the insufficient resolution of the A/D for the AM signal to be located outside the AM frequency band, which are then filtered out by a lowpass filter. Note that since the predetermined offset is based upon the bandwidth of the frequency band being utilized, which in this case is the AM band, the predetermined offset can be adjusted accordingly based on the size of the bandwidth.

In the example provided in FIGURE, the AM bandwidth is 10 kHz, hence the minimum predetermined offset that may be used by the AM-RF frontend is 5 kHz. In this case oscillator 114 is set such that the predetermined offset is 25 kHz.

Since the local oscillator frequency 112 frequency has been adjusted to accommodate for the predetermined offset (10.825 MHz plus the tuning frequency RFTF), it is supplied to mixer 108 in conjunction with the amplified RF signals 106. The local oscillator frequency 112 is mixed with the amplified RF signals 106 and passed through bandpass filter 116. In certain embodiments, bandpass filter 116 can be a crystal filter, ceramic filter, or any type of analog bandpass filter that isolates the desired frequencies. The output of bandpass filter 116 (centered at 10.825 MHz) is amplified by IF amplifier 118 and provided to A/D converter 122.

The output of IF amplifier 118 is digitized at a sampling rate dictated by the sample rate of the A/D converter used in the IF processing block. In this case the sampling rate, $F_s$, of the A/D converter is 14.4 MHz. The sampling rate is used by the A/D converter to alias the output of IF amp 118 to 3.625 MHz. The details of how this is accomplished and the process used by the A/D converter to perform the analog-to-digital conversions are known in the art and are therefore not described in detail.

Downconverter 130 receives the digitized output 126 of A/D 122 and downconverts the received digitized output to an in-phase digital signal 134 and a quadrature-phase digital signal 135 both centered at a frequency of 25 kHz. Decimator 136 receives in-phase digital signal 134 and quadrature-phase digital signal 135 output by down converter 130 and reduces the sampling rate from 14.4 MHz to a minimal sampling rate in order to conserve processing cycles in signal processor 144.

Downconverter 140, which in this embodiment serves as a digital complex mixer, receives the output of decimator 136 and downconverts the in-phase digital signal 138 and quadrature-phase digital signal 139 from the predetermined offset frequency of 25 kHz to baseband frequency centered at 0 Hz. Signal processor 144 receives baseband signal 142 and performs traditional AM signal processing such as, automatic gain control, weak signal processing, lowpass filtering, etc. Baseband signal 142 is processed by signal processor 144, and since the spurious tones are now located outside our AM band due to the addition of the predetermined offset, signal processor 144 applies a lowpass filter to generate a spurious-tone free audio signal. Thus, the spurious tones have been eliminated utilizing the predetermined offset and downcoverter 140 and by applying the low pass filter of signal processor 144 to yield the desired audio output 152.

As stated previously, the predetermined offset added to the IF frequency component is based on the AM bandwidth. The selected predetermined offset must be greater than or equal to half of the AM bandwidth but less than or equal to the system bandwidth. For example, for a system whose AM bandwidth is 10 kHz, the minimum predetermined offset is 5 kHz. In another example, for a system whose AM bandwidth is 40 kHz, the minimum predetermined offset is 20 kHz. In yet another example, for a system whose AM bandwidth is 50 kHz, the minimum predetermined offset is 25 kHz. Note that the predetermined offset can be adjusted to account for other system considerations, such as, downconverter simplification, re-use of bandpass filter 116, weather band processing, etc. so long as the predetermined offset is within the minimum and maximum predetermined offset range described above.

The imprecision offset of local oscillator 112 includes the component imprecision and tuning imprecision. The component imprecision is due to component tolerance, for example, the crystal oscillator's frequency not aligning itself to its nominal frequency. The imprecision component manifests itself as the amount the local oscillator deviates from its programmed frequency. Tuning imprecision is caused by the AM Front End's Local Oscillator not locking up to the incoming carrier. The tuning imprecision is the difference between the broadcast carrier frequency and the programmed RFTF frequency.

The intermediate frequency component of the local oscillator frequency 112 is based upon the intermediate frequency of the IF processing block 148. For example, in the embodiment of the FIGURE, the IF frequency of the IF processing block is 10.8 MHz, resulting in the IF frequency of the local oscillator frequency 112 being set to 10.8 MHz. In certain embodiments of the present invention, in order to reduce digression from the existing FM architecture, the same IF frequency used for the FM-RF frontend 146 is also used by AM-RF frontend 107.

When the AM/FM DWF radio receiver is in AM mode, AM front-end 107 is active, downconverter 140 is active, and FM front-end 146 is inactive. FM signal processing blocks used in signal processor 144 are also in-active. For example, when AM/FM DIF radio receiver 100 is in AM mode, features used for FM transmission such as, FM demodulator, FM automatic gain control (AGC), etc. are inactive, while AM demodulator, AM AGC, etc. are active. Features that perform both AM and FM functions, are held active during there specified AM or FM function. Similarly, when the AM/FM DWF radio receiver is in FM mode, FM frontend 146 is active, AM frontend 107 is inactive, downconverter 140 and signal processing blocks used in signal processor 144 are held inactive. For example, in the embodiment shown in FIGURE, receiver 100 is in AM mode and an AM/FM signal is received by antenna 102. Since the receiver is in AM mode, FM RF front-end 146 is inactive and AM frontend 107 and IF-to-Audio Converter 150 is active (excluding FM specific features).

As it is necessary to eliminate spurious tones in a receiver in order to ascertain nominal audio output, an effective way of removing the spurious tones has been provided herein. By adding a predetermined offset to the local oscillator frequency and providing the corresponding down converter to adjust for the predetermined offset, the spurious tones are eliminated. The addition of the predetermined offset and corresponding components allows the AM/FM DIF radio receiver to circumvent the spurious noise associated with the resolution of the A/D and generate crisp, clean sounding AM audio.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A circuit having a system bandwidth, comprising:
   a front end for generating a first IF signal having a first frequency, said first IF signal having a predetermined offset; and
   an IF to audio converter coupled to said front end, characterized by:
   being responsive to a clock signal, said clock signal having a second frequency; and
   receiving said first IF signal and converting said first IF signal to an audio signal; and
   wherein:
   the IF to audio converter generates a spurious signal outside a desired bandwidth at a frequency proportional to the sum of an imprecision offset and said predetermined offset.

2. The circuit of claim 1, wherein the IF to audio converter comprises:
   an A/D converter having an input for receiving the first IF signal;
   a first down converter having an input coupled to the A/D converter and an output; and
   a decimator having an input coupled to the output of the first down converter and an output.

3. The circuit of claim 2, wherein the IF to audio converter further comprises:
   a second down converter having an input coupled to the output of the decimator and an output;
   a signal processor having an input coupled to the output of the second down converter and an output for providing the audio signal.

4. The circuit of claim 3, further comprising an FM front end having an input for receiving an FM signal and having an output coupled to the IF to audio converter.

5. The circuit of claim 1, wherein the output of the FM front end provides a second IF signal having a third frequency that is different than said first frequency by said predetermined offset.

6. The circuit of claim 5, wherein the AM front end comprises a filter having a passband with a center frequency that is the first frequency.

7. The circuit of claim 1, wherein said front end is an AM front end and said desired bandwidth is an AM bandwidth.

8. The circuit of claim 1, wherein the first frequency is approximately 10.825 MHz, the second frequency is about 14.4 MHz, the predetermined offset is 25 KHz, and the frequency of the spurious signal is greater than the predetermined offset.

9. The circuit of claim 1, wherein the predetermined offset is greater than or equal to half of the desired bandwidth and less than or equal to the system bandwidth.

10. The circuit of claim 1, wherein the AM front end comprises:
an amplifier for receiving an AM signal;
a mixer coupled to the amplifier;
a filter coupled to the mixer; and
an amplifier coupled to the filter and providing the first IF signal.

11. A circuit having a system bandwidth and an AM bandwidth, comprising:
an FM front end for generating a first IF signal having a first frequency;
an AM front end for generating a second IF signal having a second frequency and a predetermined offset; and
an IF processor for receiving a selected one of the first IF signal and the second IF signal, characterized by:
when receiving the first IF signal, converting the first IF signal to a first baseband signal; and
when receiving the second IF signal, converting the second IF signal to a third signal having a center frequency at said predetermined offset, converting said third signal to a second baseband signal and filtering out a spurious tone.

12. The circuit of claim 11, wherein the predetermined offset is greater than or equal to half of the AM bandwidth and less than or equal to the system bandwidth.

13. The circuit of claim 11, wherein said converting the second IF signal converts the second IF signal to a signal having a center frequency of about 25 KHz.

14. A circuit having a system bandwidth, comprising:
an AM front end for generating a first IF signal having a first frequency and a predetermined offset;
an IF to audio converter coupled to said AM front end, characterized by:
being responsive to a clock signal that has a second frequency; and
receiving the first IF signal and converting said first IF signal to an audio signal; and
wherein:
the IF to audio converter generates a spurious signal outside an AM bandwidth at a frequency proportional to the sum of a imprecision offset and said predetermined offset, said predetermined offset being greater than or equal to half of said AM bandwidth and less than or equal to said system bandwidth.

15. The circuit of claim 14, wherein said IF to audio converter filters said AM bandwidth to remove the spurious signal.

16. A method of processing an AM signal in a circuit having a system bandwidth, comprising:
deriving a first IF signal having a predetermined offset and a first frequency from the AM signal;
responsive to a clock signal that has a second frequency, converting the first IF signal to an audio signal; and
generating a spurious signal outside an AM bandwidth at a frequency proportional to the sum of an imprecision offset and the predetermined offset.

17. The method of claim 16, wherein the predetermined offset is greater than or equal to half of the AM bandwidth and less than or equal to the system bandwidth.

18. The method of claim 16, wherein the spurious signal is at least 5 KHz.

19. The method of claim 16, wherein spurious signal is about 25 KHz.

20. The method of claim 19, further comprising filtering the AM bandwidth to remove the spurious signal.

* * * * *